United States Patent
Satoh et al.

(10) Patent No.: US 12,074,952 B2
(45) Date of Patent: Aug. 27, 2024

(54) SOFTWARE UPDATE DEVICE, SOFTWARE UPDATE METHOD, AND CENTER

(71) Applicant: TOYOTA JIDOSHA KABUSHIKI KAISHA, Toyota (JP)

(72) Inventors: Yusuke Satoh, Nisshin (JP); Tomoyasu Ishikawa, Nagoya (JP); Satoru Fukuyo, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 465 days.

(21) Appl. No.: 17/355,816

(22) Filed: Jun. 23, 2021

(65) Prior Publication Data
US 2022/0014604 A1 Jan. 13, 2022

(30) Foreign Application Priority Data
Jul. 8, 2020 (JP) .................... 2020-117847

(51) Int. Cl.
*H04L 29/08* (2006.01)
*H04L 67/00* (2022.01)
*H04W 4/40* (2018.01)
*H04W 12/06* (2021.01)

(52) U.S. Cl.
CPC ............ *H04L 67/34* (2013.01); *H04W 4/40* (2018.02); *H04W 12/06* (2013.01)

(58) Field of Classification Search
CPC ...... H04L 67/34; H04L 63/0853; H04W 4/40; H04W 12/06; G06F 21/445; G06F 21/572; G06F 21/629; G06F 8/65; G06F 8/61; G06F 8/71
See application file for complete search history.

(56) References Cited

U.S. PATENT DOCUMENTS

| | | | | |
|---|---|---|---|---|
| 8,875,123 | B2* | 10/2014 | Shiba | G06F 8/65 717/173 |
| 10,795,661 | B2* | 10/2020 | Hayashidera | H04L 67/34 |
| 11,023,223 | B2* | 6/2021 | Ishikawa | H04W 4/40 |
| 11,620,125 | B2* | 4/2023 | Satoh | G06F 8/65 717/168 |
| 11,625,233 | B2* | 4/2023 | Ishikawa | G06F 8/65 717/170 |
| 11,720,349 | B2* | 8/2023 | Fukuyo | G06F 8/454 717/170 |
| 11,736,577 | B2* | 8/2023 | Nagamitsu | H04L 67/12 709/203 |

(Continued)

FOREIGN PATENT DOCUMENTS

| | | |
|---|---|---|
| JP | 2011-148398 A | 8/2011 |
| JP | 2016-016835 A | 2/2016 |

(Continued)

*Primary Examiner* — Baotran N To
(74) *Attorney, Agent, or Firm* — Oblon, McClelland, Maier & Neustadt, L.L.P.

(57) ABSTRACT

A software update device is configured to be controlled in response to a request from a mobile terminal device. The software update device includes one or more processors configured to: acquire cooperation information indicating that connection of the mobile terminal device to a vehicle is made; and manage whether the mobile terminal device is permitted to execute interface processing related to software update, which is determined in accordance with at least the cooperation information.

14 Claims, 6 Drawing Sheets

(56) References Cited

U.S. PATENT DOCUMENTS

| | | | |
|---|---|---|---|
| 11,740,889 B2* | 8/2023 | Fukuyo | H04L 67/12 |
| | | | 717/173 |
| 11,755,308 B2* | 9/2023 | Takatsuna | H04L 67/34 |
| | | | 717/173 |
| 2019/0294429 A1 | 9/2019 | Mizutani et al. | |
| 2020/0174778 A1* | 6/2020 | David | H04W 4/80 |
| 2021/0011709 A1* | 1/2021 | Itatsu | B60R 16/02 |

FOREIGN PATENT DOCUMENTS

| | | |
|---|---|---|
| JP | 2019-79205 A | 5/2019 |
| JP | 2019-144669 A | 8/2019 |
| KR | 10-2018-0100994 A | 9/2018 |
| WO | WO 2019/181496 A1 | 9/2019 |
| WO | WO 2019/187392 A1 | 10/2019 |

* cited by examiner

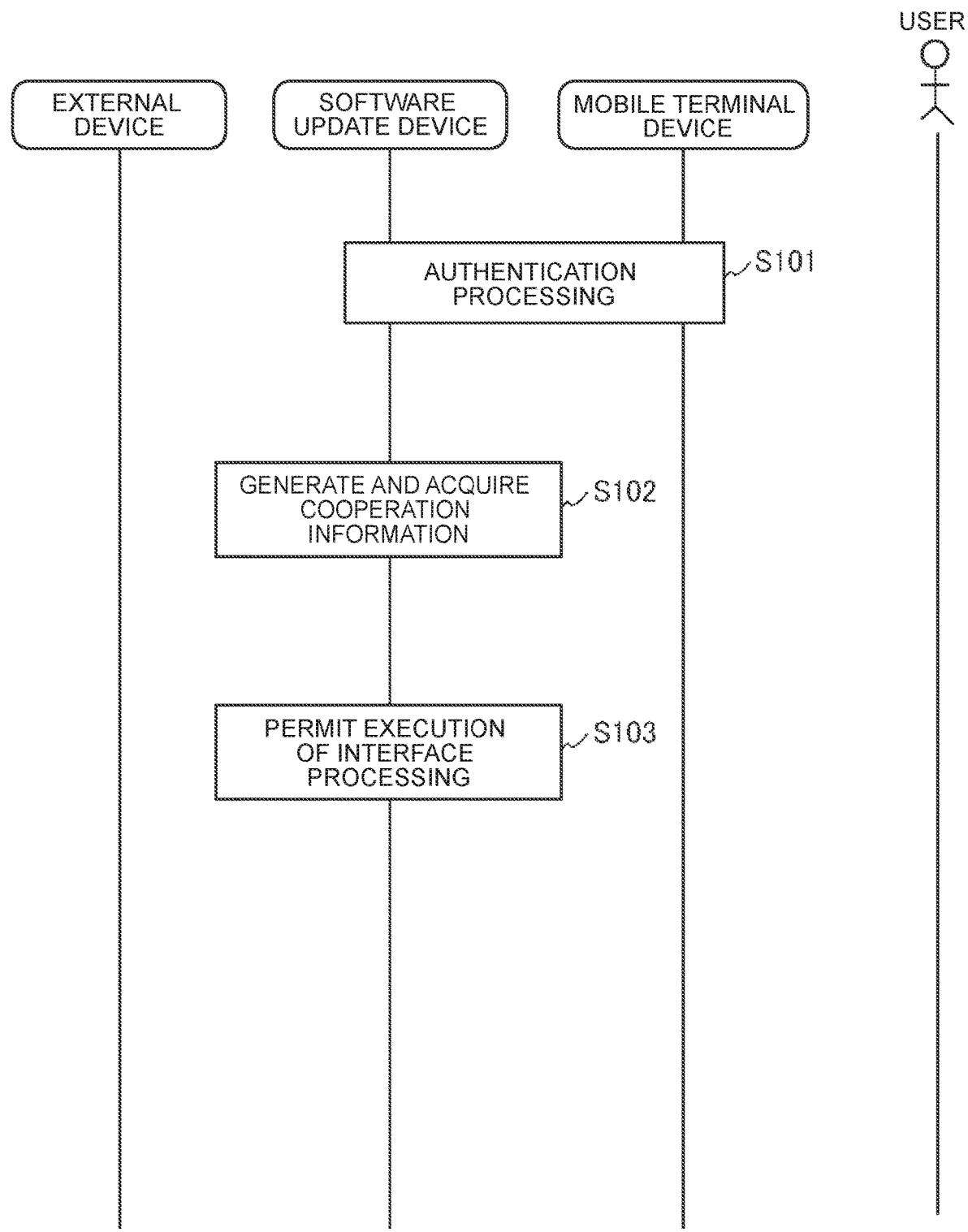

SOFTWARE UPDATE DEVICE, SOFTWARE UPDATE METHOD, AND CENTER

CROSS-REFERENCE TO RELATED APPLICATION

This application claims priority to Japanese Patent Application No. 2020-117847 filed on Jul. 8, 2020, incorporated herein by reference in its entirety.

BACKGROUND

1. Technical Field

The present disclosure relates to a software update device, a software update method, and a center.

2. Description of Related Art

A vehicle is equipped with a network system configured such that a plurality of in-vehicle devices called electronic control units (ECUs) is connected to each other via a communication line. Each of the in-vehicle devices transmits and receives a message to and from the other in-vehicle devices so as to share and execute functions of the vehicle.

The in-vehicle devices typically include a processor and a transitory storage unit such as random access memory (RAM) or a non-volatile storage unit such as flash read-only memory (ROM). A program (software) executed by the processor is stored in the non-volatile storage unit. Rewriting and updating of the program to a newer version makes it possible to upgrade and improve functions of the in-vehicle device.

Updating of the program involves a step of downloading in which update data is received from an external device (a center) via a wireless communication, etc., and a step of installation in which an update program (update software) is written in the storage unit of the in-vehicle device based on the downloaded update data. There are two types of installation of the program, that is, an overwriting installation and a second side installation, depending on the specification of the in-vehicle device. The overwriting installation is an installation in which the update program is written in one region (single side) that is determined as a region for storing the program from the entire memory region of the storage unit. The second side installation is an installation in which, of two regions (double sides) that are determined as regions for storing the program, the downloaded update program is written into one of the regions (second side) that is not a region (first side) in which the current program (previous program) is stored.

In the case of the second side installation, the step of updating program involves an activation step of configurating a set value such as a start address of the update program such that the installed update program becomes executable, in addition to the steps of downloading and installation.

In relation to the program update of the ECU, Japanese Unexamined Patent Application Publication No. 2011-148398 (JP 2011-148398 A) discloses a technology that a specific ECU functions as a master ECU, communicates with a server, and updates the program of the master ECU and other slave ECUs.

On the other hand, in vehicles, a service that uses a mobile terminal device such as a smartphone as an electronic key has been proposed. In the service above, for example, the vehicle authenticates the mobile terminal device as the electronic key via wireless communication, and permits a user holding the mobile terminal device to perform operations such as unlocking and locking of the door. Japanese Unexamined Patent Application Publication No. 2016-016835 (JP 2016-016835 A) discloses that in a car sharing system in which a plurality of users shares one vehicle, a mobile terminal device such as a smartphone held by each user is provided with a function as the electronic key.

SUMMARY

It is conceivable to use the mobile terminal device such as a smartphone as a user interface for receiving a user command related to program update of the in-vehicle device. In this case, there is a room for improvement in execution of authority management in consideration of security.

The present disclosure provides a software update device, a software update method, and a center that suitably grant a mobile terminal device an authority as a user interface for program update processing of the in-vehicle device.

A software update device according to an aspect of the present disclosure is configured to be controlled in response to a request from a mobile terminal device. The software update device includes one or more processors configured to: acquire cooperation information indicating that connection of the mobile terminal device to a vehicle is made; and manage whether the mobile terminal device is permitted to execute interface processing related to software update, which is determined in accordance with at least the cooperation information.

A software update method according to a second aspect of the present disclosure is executed by a computer of a software update device configured to be controlled in response to a request from a mobile terminal. The software update method includes: acquiring cooperation information indicating connection of the mobile terminal device to a vehicle; and managing whether the mobile terminal device is permitted to execute interface processing related to software update, which is determined in accordance with at least the cooperation information.

A center according a third aspect of the present disclosure includes one or a plurality of processors configured to provide information used for executing interface processing related to software update to a mobile terminal device when a software update device permits the mobile terminal device to execute the interface processing based on at least cooperation information indicating that connection of the mobile terminal device to a vehicle is made.

A center according a fourth aspect of the present disclosure includes one or more processors configured to: acquire, from a software update device, cooperation information indicating that connection of a mobile terminal device to a vehicle is made; and determine whether the mobile terminal device is permitted to execute interface processing related to software update based on at least the cooperation information.

According to the present disclosed technology, the mobile terminal device is granted the authority as the user interface for the update processing based on that the vehicle authenticates the mobile terminal device as the electronic key and the predetermined operation to the vehicle is actually performed using the mobile terminal device as the electronic key. This makes it possible to preferably guarantee a reliability of the mobile terminal device as the user interface.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3B is a sequence diagram showing processing according to the embodiment;

DETAILED DESCRIPTION OF EMBODIMENTS

Configuration

Figure 1:
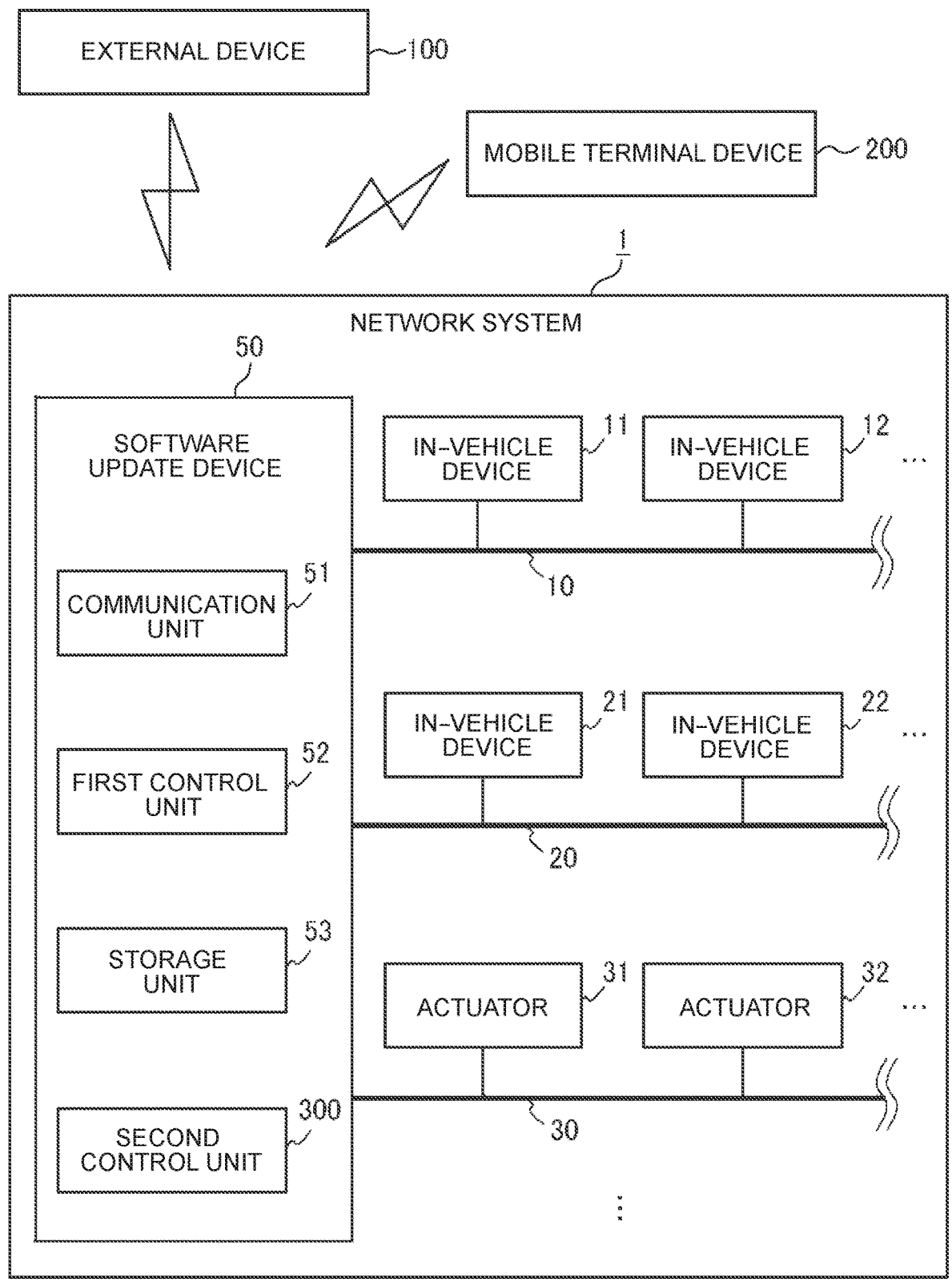
FIG. 1 is a configuration diagram of a network system according to an embodiment.

FIG. 1 shows a configuration example of a network system 1 according to an embodiment. The network system 1 is mounted on a vehicle. The network system 1 includes a software update device (over-the-air (OTA) master) 50. A plurality of buses 10, 20, 30, . . . is connected to the software update device 50. A plurality of in-vehicle devices (electronic control units) 11, 12, . . . is connected to the bus 10. A plurality of in-vehicle devices 21, 22 . . . is connected to the bus 20. A plurality of actuators 31, 32 . . . is connected to the bus 30. In FIG. 1 and the following description, the buses 10, 20, 30 are exemplified as the buses, the in-vehicle devices 11, 12, 21, 22 are exemplified as the in-vehicle devices, and the actuators 31, 32 are exemplified. However, the numbers of the buses, the in-vehicle devices, and the actuators are not limited.

The software update device 50 includes a communication unit (communication module) 51 that is communicable with an external device (center) 100 provided outside of the vehicle and a mobile terminal device 200, and a first control unit 52 and a second control unit 300 that control update of programs of the in-vehicle devices 11, 12, 21, 22 based on update data provided by the external device 100. The software update device 50 is typically a computer including a non-volatile storage unit (storage) 53 such as a flash ROM, a control unit (one or more processors) that executes various types of processing by reading the program (software) from the non-volatile memory 53 and executing the program, and a transitory storage unit that stores a part of the program and data, such as a RAM. The software update device 50 controls and relays communication between the external device 100 and the in-vehicle devices 11, 12, 21, 22, communication among the in-vehicle devices 11, 12, 21, 22, communication between the in-vehicle devices 11, 12, 21, 22 and the actuators 31, 32, via the buses 10, 20, 30. As described above, the software update device 50 also functions as a relay device that relays communication.

Figure 2A:
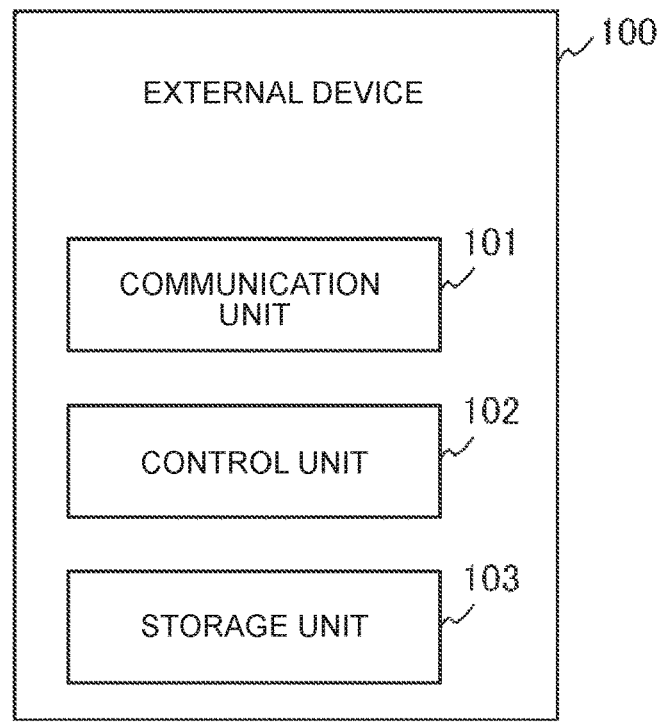
FIG. 2A is a functional block diagram of an external device according to the embodiment.

The in-vehicle devices 11, 12, 21, 22 communicate with each other and execute various types of processing for controlling the vehicle. Similar to the software update device, the in-vehicle devices above are typically computers each including a storage unit and a control unit. Similar to the software update device, the external device 100 is typically a computer including a storage unit (storage) 103, a control unit (one or more processors) 102, and a communication unit 101, as shown in FIG. 2A.

The actuators 31, 32 are devices that generate mechanical actions with respect to the vehicle and components of the vehicle, such as a brake, an engine, or a power steering device, and operate based on commands from the in-vehicle devices 11, 12, 21, 22.

The first control unit 52 of the software update device 50 can update the programs stored in the respective storage units (storages) of the in-vehicle devices 11, 12, 21, 22. That is, the software update device 50 executes download control or installation control, or further executes activation control of the program. Downloading is processing to receive, from the external device 100, the transmitted update data (distribution package) for updating any of the programs of the in-vehicle devices 11, 12, 21, 22 and to store the update data. The download control may include, in addition to execution of downloading, control of a series of processing related to downloading, such as determination as to whether to execute downloading and verification of the update data. Installation is processing to write an update version of the program (update software) in the storage unit of the in-vehicle device to be updated based on the downloaded update data. The installation control may include, in addition to execution of installation, control of a series of processing related to installation, such as determination as to whether to execute installation, transfer of the update data, and verification of the updated version of the program. Activation is processing to validate (activate) the installed updated version of the program. The activation control may include, in addition to execution of activation, control of a series of processing related to activation, such as determination as to whether to execute activation and verification of execution results.

In the installation control, when the update data includes the update program itself, the first control unit 52 can transmit the update program to the in-vehicle device. When the update data includes compressed data, difference data, or divided data of the update program, the first control unit 52 may generate the update program by decompressing or assembling the update data and transmit the update program to the in-vehicle device. Alternatively, the first control unit 52 may transmit the update data to the in-vehicle device, and the in-vehicle device may generate the update program by decompressing or assembling the update data.

The first control unit 52 may execute installation to write the update program to a second storage unit of the in-vehicle device, the in-vehicle device that has received a command from the first control unit 52 may execute the installation, or the in-vehicle device that has received the update data (or the update program) may autonomously execute the installation without an explicit command from the first control unit 52.

The first control unit 52 may execute activation to activate the update program, the in-vehicle device that has received a command from the first control unit 52 may execute the activation, or the in-vehicle device may autonomously execute the activation following the installation without an explicit command from the first control unit 52.

Note that, the update processing of the program as described above can be executed continuously or in parallel with respect to the in-vehicle devices. The update data is data used for generating the update program. The content and format of the upload data are not limited. For example, the update data includes the update program itself, difference data for generating the update program, or compressed data or divided data of the update program, etc. Further, the update data may include an identifier (ECU ID) of the in-vehicle device (target electronic control unit) of which program is to be updated and an identifier (WCU software ID) of the version of the program before the update.

The mobile terminal device 200 is a mobile computer, such as a smartphone, including a display unit that displays and presents information to the user and an input unit that receives an operation by the user. The mobile terminal device 200 functions as an electronic key of the vehicle. An authentication device (not shown) provided in the vehicle communicates with the mobile terminal device to execute a predetermined authentication via short-range wireless communication. When the authentication is successful, various operations to the vehicle are permitted, such as unlocking or locking of the door as the user touches a door handle, for example. With the configuration above, the user who holds the mobile terminal device 200 is permitted to perform various operations to the vehicle.

The mobile terminal device 200 communicates with the communication unit 51 of the software update device 50 described above, and transmits and receives information related to updates of the in-vehicle devices 11, 12, 21, 22 to be executed by the first control unit 52, and then the software update device 50 can display a screen to ask the user for permission of update or receive an input by the user indicating the permission for update, for example. The processing described above including displaying of information related to the program update to be executed by the mobile terminal device 200 and reception of the operation by the user is hereinafter referred to as interface processing. The mobile terminal device 200 can execute functions according to the present embodiment by executing a predetermined application program, for example, even when the mobile terminal device 200 is a general-purpose device.

Figure 2B:
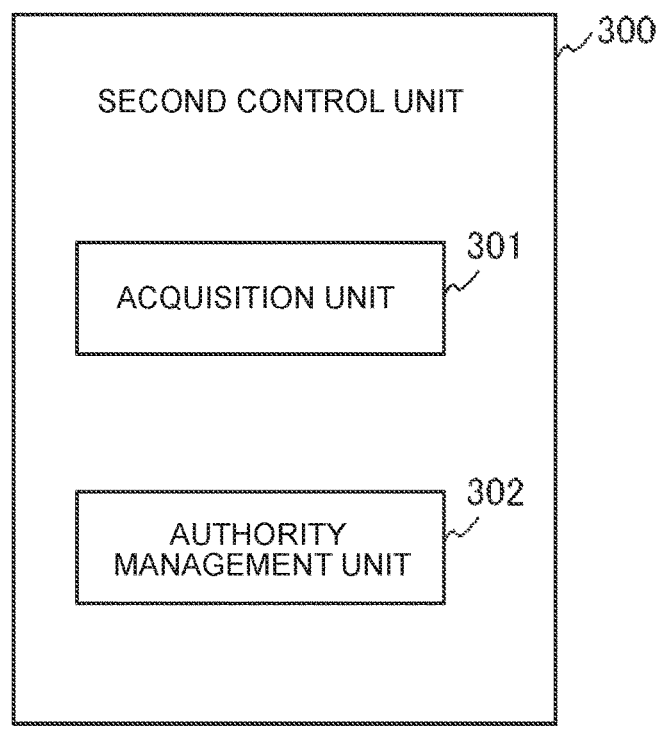
FIG. 2B is a functional block diagram of a second control unit of a software update device according to the embodiment.

FIG. 2B shows a functional block of the second control unit 300. The second control unit 300 includes an acquisition unit 301 and an authority management unit 302. The acquisition unit 301 acquires cooperation information indicating that the user has performed a predetermined operation of the vehicle using the mobile terminal device 200 as the electronic key. The authority management unit 302 manages whether the mobile terminal device 200 is permitted to execute the interface processing. Whether the mobile terminal device 200 is permitted to execute the interface processing is determined in accordance with at least the acquisition unit 301 acquiring the cooperation information.

Processing

Figure 3A:
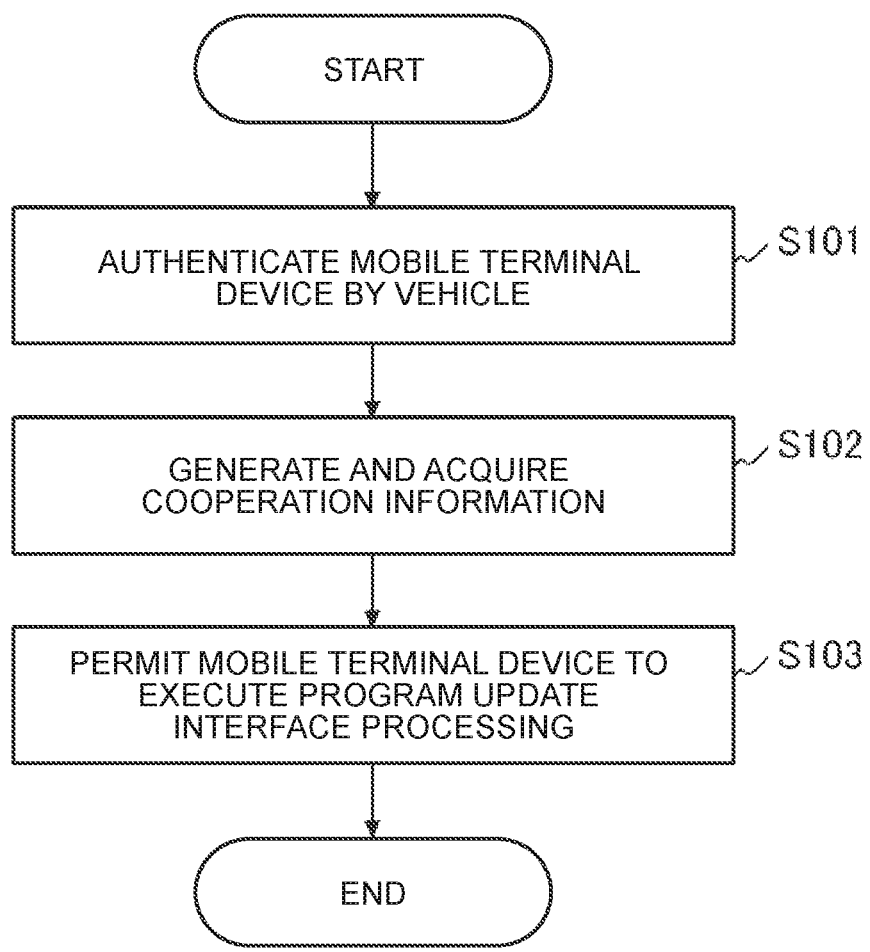
FIG. 3A is a flowchart showing processing according to the embodiment.
Figure 3C:
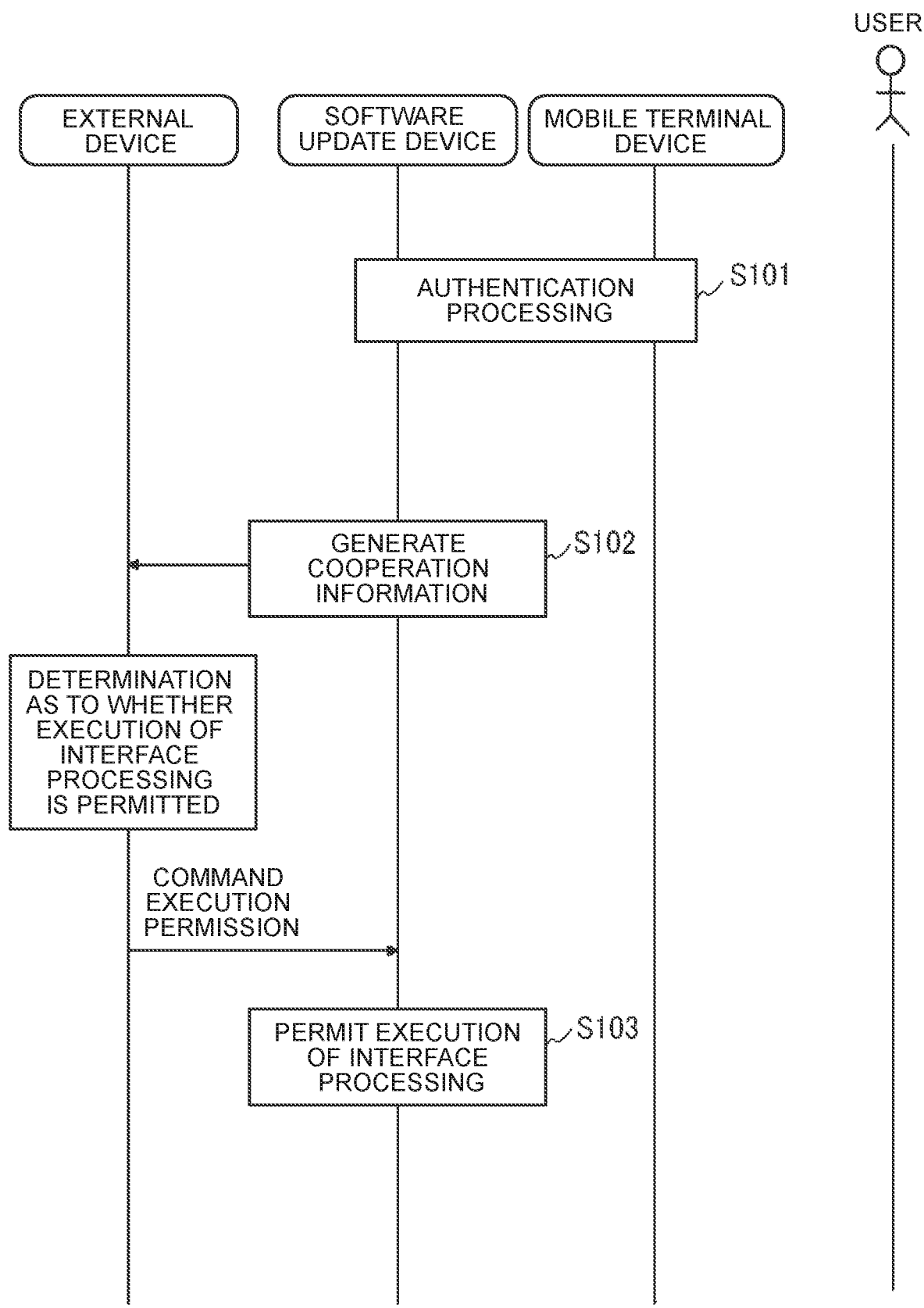
FIG. 3C is a sequence diagram showing processing according to the embodiment.
Figure 4:
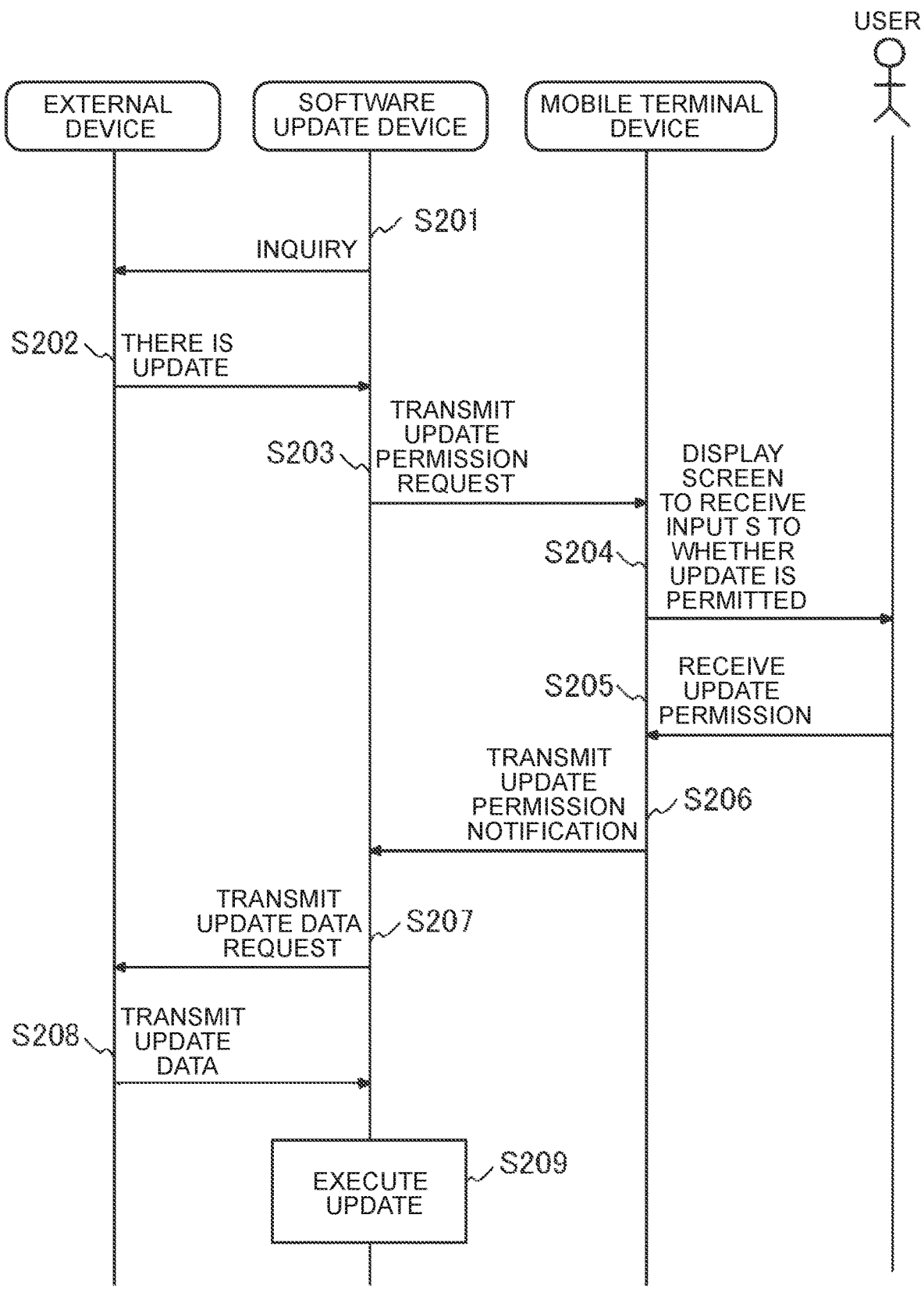
FIG. 4 is a sequence diagram showing processing according to the embodiment.

The details of the processing according to the embodiment will be described below. FIGS. 3A, 3B, and 3C are flowcharts and sequence diagrams showing an example of processing in which the authority management unit 302 permits the mobile terminal device 200 to execute the interface processing. FIG. 4 is a sequence diagram showing an example of program update processing including the interface processing to be executed by the mobile terminal device 200. Note that the processing above is typically executed in a state where the vehicle is stopped, such as when a power supply is turned off (an ignition is turned off or a power is turned off).

First, with reference to FIGS. 3A and 3B, an example of processing in which the second control unit 300 of the software update device 50 permits the mobile terminal device 200 to execute the interface processing will be described.

Step S101

The mobile terminal device 200 performs short-range wireless communication with the authentication device of the vehicle and is authenticated by the authentication device. The authentication device may be provided in the software update device 50, or may be provided separately from the software update device 50.

Step S102

When the mobile terminal device 200 is authenticated, the authentication device generates the cooperation information indicating that the mobile terminal device 200 is authenticated. The acquisition unit 301 of the second control unit 300 acquires the cooperation information. When the user holding the authenticated mobile terminal device 200 touches the door handle, for example, the operation such as unlocking and locking of the door is permitted, and the operation is actually executed. As in the example above, the mobile terminal device 200 has a function of requesting the vehicle for permission for a part of or the entire vehicle control when the vehicle authenticates the mobile terminal device 200. The authentication device may generate cooperation information when a predetermined vehicle operation is actually executed. As described above, the cooperation information is information indicating that the mobile terminal device 200 is functionally connected to the vehicle and is used in cooperation with the vehicle in various operations to the vehicle.

Step S103

When the acquisition unit 301 acquires the cooperation information, the authority management unit 302 of the second control unit 300 sets the mobile terminal device 200 as the mobile terminal device that is permitted for the execution of the interface processing.

In the execution permission processing for the interface processing above, the authority management unit 302 may refer to user authority information (to be described later) indicating whether the user is granted an update management authority, and may permit the mobile terminal device 200 to execute the interface processing as long as the user is granted the update management authority, in addition to acquisition of the cooperation information.

As in a modified example shown in FIG. 3C, the external device 100 may determine whether to permit execution of the interface processing, and the authority management unit 302 may permit execution of the interface processing in accordance with a determination result. In this case, in step S102, the authority management unit 302 of the second control unit 300 controls the communication unit 51 to transmit the cooperation information to the external device 100. Further, the control unit 102 of the external device 100 that has received the cooperation information controls the communication unit 101 to issue a command to the authority management unit 302 of the vehicle such that the authority management unit 302 sets the mobile terminal device 200 as the mobile terminal device that is permitted for execution of the interface processing with respect to the corresponding vehicle. In step S103, the authority management unit 302 sets the mobile terminal device 200 as the mobile terminal device that is permitted for execution of the interface processing in accordance with the command. In this case, the external device 100 may refer to the user authority information to be described later and permit execution of the interface processing only when the user is granted the update management authority, in addition to acquisition of the cooperation information.

Further, as another modification, the mobile terminal device 200 may permit the mobile terminal device 200 itself to execute the interface processing based on the authentication processing in step S101. In this case, the mobile terminal device 200 may refer to the user authority information (to be described later) indicating whether the user is granted the update management authority, and may permit execution of the interface processing as long as the user is granted the update management authority, in addition to execution of the authentication processing.

Next, an example of the program update processing including the interface processing of the mobile terminal device 200 will be described with reference to FIG. 4.

Step S201

The first control unit 52 of the software update device 50 controls the communication unit 51 to inquire the external device 100 whether there is the update program for the in-vehicle device mounted on the vehicle.

Step S202

When the communication unit 101 receives the inquiry, the control unit 102 of the external device 100 transmits, to the software update device 50, an update notification indicating that there is the update program. The update program or the update data for generating the update program is stored in, for example, the storage unit 103.

Step S203

When the communication unit 51 receives the update notification, the first control unit 52 of the software update device 50 controls the communication unit 51 to transmit an update permission request to the mobile terminal device 200 set as the mobile terminal device that is permitted for execution of the interface processing in step S103 above.

Step S204

The mobile terminal device 200 displays a screen on the display unit to receive an input as to whether the update is permitted.

Step S205

The mobile terminal device 200 receives the input from the user to permit the update.

Step S206

The mobile terminal device 200 transmits, to the software update device 50, an update permission notification indicating that the update is permitted by the user. When the input indicating that the update is not permitted is received from the user in step S205, the mobile terminal device 200 transmits, to the software update device 50, an update dismissal notification indicating that the update is not permitted by the user.

Step S207

When the communication unit 51 receives the update permission notification, the acquisition unit 301 of the software update device 50 controls the communication unit 51 to transmit an update data request to the external device 100. Note that, the first control unit 52 of the software update device 50 terminates the processing when the communication unit 51 receives the update dismissal notification.

Step S208

The control unit 102 of the external device 100 controls the communication unit 101 to transmit the update data to the software update device 50.

Step S209

The communication unit 51 of the software update device 50 receives the update data (the downloading described above), and the first control unit 52 controls the in-vehicle device (not shown) to be updated based on the update data to store an update version of the program or perform initialization (the installation and the activation described above). Note that, when the update data includes the update program itself in the installation processing, the first control unit 52 transmits the update program to the in-vehicle device. When the update data includes compressed data, difference data, or divided data of the update program, the first control unit 52 may generate the update program by decompressing or assembling the update data and transmit the update program to the in-vehicle device. Alternatively, the first control unit 52 may transmit the update data to the in-vehicle device, and the in-vehicle device may generate the update program by decompressing or assembling the update data. Note that, the external device 100 and the software update device 50 may explicitly issue a command to the in-vehicle device to execute the installation and the activation and the in-vehicle device may execute the installation and the activation based on the command, or the in-vehicle device that has received the update data (or the update program) may autonomously execute the installation and the activation without any explicit command.

The explanation for each step is as described above. In the example above, the user can command whether to permit the update program using the mobile terminal device 200 set as the electronic key. Similarly, using the mobile terminal device 200, the user can command whether inquiry of the presence or absence of the update program in step S201 described above is permitted, whether the update data request for downloading in step S207 is permitted, and whether the installation and the activation in step S209 are permitted.

As described above, the interface processing includes presentation of a progress status at one or more stages in the update processing, and reception of a command indicating whether further progress is permitted. Further, the mobile terminal device 200 may receive a command to update only the program of a specific in-vehicle device among the in-vehicle devices, for example, and the software update device 50 may execute update in accordance with the command. As described above, the information presented to the user by the mobile terminal device 200 and the command received by the mobile terminal device 200 from the user and executed by the software update device 50 are not limited.

In the example above, the second control unit 300 grants the mobile terminal device 200 an authority as a user interface for the update processing based on that the vehicle authenticates the mobile terminal device 200 as the electronic key and a predetermined operation to the vehicle is actually performed using the mobile terminal device 200 as the electronic key, that is, based on the authentication result and a history of usage as the electronic key.

With the processing above, reliability of the mobile terminal device 200 as the user interface from the standpoint of the vehicle can be more preferably guaranteed. The content of the predetermined operation above is not limited. However, the reliability can be more enhanced when the operation is an operation from which it can be estimated with high accuracy that the user is a driver of the vehicle, such as an opening operation or a closing operation of a driver door of the vehicle.

Further, the vehicle does not need to include the display unit when the mobile terminal device 200 can display and present information to the user and can receive the input from the user. Therefore, the update processing can be executed while the input from the user is received even when the vehicle is not provided with the display unit such as a car navigation system and a device including the input unit.

The acquisition unit 301 of the second control unit 300 may acquire the user authority information indicating whether the user associated with the mobile terminal device 200 is granted the update management authority, and in step S103, the authority management unit 302 may sets the mobile terminal device 200 as the mobile terminal device that is permitted for execution of the interface processing when the user is granted the update management authority including an authority to update the program of the in-vehicle device, in addition that the vehicle authenticates the mobile terminal device 200 as the electronic key and the predetermined operation to the vehicle is performed.

With the processing above, when the vehicle has a plurality of the users, only the user who is granted the update management authority can permit the program update. For example, when the users include an owner and a customer such as in the case of a car sharing service, a function as the user interface related to the program update can be assigned to the mobile terminal device of the owner only, and cannot be assigned to the mobile terminal device of a general customer. The user authority information is registered in advance in the mobile terminal device 200 or the external device 100 by a person having appropriate authority, and the acquisition unit 301 acquires the user authority information from the registered information. The external device 100 may create information such as a program or data for executing the interface processing in accordance with the user authority information, store the created information in association with the user authority information, and provide the associated information to the mobile terminal device 200. The information for executing the interface processing is data indicating, for example, whether the inquiry for the presence or absence of the update program in step S201 above is permitted, whether the update data request in step S207 for downloading is permitted, whether the installation is permitted and the activation is permitted in step S209, a program to be executed by the mobile terminal device 200 so as to receive a command from the user, or a text or graphical user interface (GUI) to be displayed on the mobile terminal device 200 and presented to the user. The control unit 102 of the external device 100 controls the communication unit 101 to provide the above data to the mobile terminal device 200 of the user who is granted the update authority directly or via the software update device 50 in accordance with a request from the mobile terminal device 200, a request from the authority management unit 302 of the software update device 50, or autonomously without any request above. The processing above can be executed at any timing between step S103 and step S203 described above. Alternatively, the information for executing the interface processing may be stored in advance in the mobile terminal device 200.

Further, the acquisition unit 301 of the second control unit 300 may acquire presentation information indicating that the mobile terminal device 200 has presented the predetermined information, and in step S103, the authority management unit 302 may set the mobile terminal device 200 as the mobile terminal device that is permitted for execution of the interface processing when the acquisition unit 301 acquires the presentation information in addition that the vehicle authenticates the mobile terminal device 200 as the electronic key and the predetermined operation to the vehicle is performed. The predetermined information is, for example, a manual for explaining a procedure for the program update. In this case, the procedure for the interface processing can be notified to the user in advance as a preliminary step before proceeding to the interface processing related to the actual program update such as downloading and installation. The information above can be transmitted by the software update device 50 or the external device 100 to the mobile terminal device 200. When the mobile terminal device 200 presents the manual to the user, or further receives, from the user, an input indicating that the user has confirmed the manual, the mobile terminal device 200 transmits the presentation information to the software update device 50.

With the processing above, execution of the interface processing is permitted after the manual, etc. is presented to the user. This makes it possible to suppress an erroneous operation of the user when user issues a command related to the update. Further, presentation of the information and confirmation of the information as described above may be performed as a part of the interface processing as in step S204. The external device 100 stores the information above such as a program and data for executing the interface processing. The external device 100 may transmit the information to the mobile terminal device 200 directly or via the software update device 50 in accordance with a request from the mobile terminal device 200 or from the vehicle. Alternatively, the vehicle may store the information and transmit the information to the mobile terminal device 200.

After step S209 described above, the first control unit 52 may notify the mobile terminal device 200 that the update has been executed, and the mobile terminal device 200 may notify the user that the update has been executed based on the notification. In this case, the mobile terminal device 200 transmits, to the software update device 50, an execution notification information indicating that the user has been notified that the program update has been executed. After step S209, the authority management unit 302 restricts a part or all of the functions of the mobile terminal device 200 as the electronic key by, for example, controlling the authentication device, until the acquisition unit 301 acquires the execution notification information.

With the processing above, it is possible to avoid confusing the user due to operating the vehicle inadvertently without knowing that the operation specifications have been changed due to the program update.

Further, after step S209, the authority management unit 302 may appropriately control the in-vehicle device such that a predetermined function of the vehicle can be operated only when a command is input to the mobile terminal device 200. The predetermined function is, for example, a function that is likely to be executed when the vehicle is used. For example, when the mobile terminal device 200 has a function of receiving a command input for engine start and requesting and causing the vehicle to start the engine, the authority management unit 302 permits only the engine start using the mobile terminal device 200, and invalidates the engine start triggered by pressing a start switch provided in the vehicle, etc.

With the processing above, when the user uses the vehicle after the update is executed, the user is reliably made to view and operate the mobile terminal device 200. This can suppress operation of the vehicle by the user without checking a notification indicating that the update has been executed. Note that, the authority management unit 302 permits execution of the predetermined function based on a command input to the other means after the predetermined function is performed based on the command input to the mobile terminal device 200 after the update is executed.

Note that downloading of the update data as in step S208 described above can be executed while the vehicle is traveling. That is, in step S205, after the user permits the update, the user may drive the vehicle during execution of steps S206, S207, and S208. During the overwriting installation and the activation above in step S209, the traveling of the vehicle may be restricted because the functions of the in-vehicle device that execute the processing are restricted. If the interface processing involves a process in which the user can command whether the installation and the activation in step S209 is permitted as described above, the user can drive the vehicle to a destination without interruption by dismissing execution of the installation and the activation while the user desires to drive and permitting the installation and the activation after the user gets off the vehicle.

Further, the authority management unit 302 may permit the mobile terminal device 200 to acquire data for updating the program using a communication method different from the communication method used by the vehicle and transmit the data to the vehicle. The communication method when the vehicle communicates with the external device 100 is, for example, wireless communication via a public wireless base station. On the other hand, the mobile terminal device 200 can acquire data from, for example, the external device 100 via an optical fiber and a wireless local area network (LAN) in the house. Even when wireless communication between the external device 100 and the software update device 50 is difficult due to a radio wave condition around the vehicle and the software update device 50 cannot receive data from the public radio base station, the mobile terminal device 200 in the house can communicate with the external device 100 using a communication method without intervening the public radio base station, which is different from the communication method of the vehicle. Therefore, the update can be executed at an early stage even when the radio wave condition around the vehicle is poor in such a manner that the mobile terminal device 200 receives the data, temporarily stores the data, and then transmits the data to the software update device 50. As described above, the mobile terminal device 200 may appropriately relay the communication between the external device 100 and the software update device 50.

Further, the second control unit 300 is provided in the software update device 50 provided in the vehicle. However, at least a part of the functions of the second control unit 300 may be provided in the external device 100. For example, the external device 100 may execute the processing of setting the mobile terminal device 200 as the mobile terminal device that is permitted for execution of the interface processing, etc. in step S103 by appropriately communicating with the software update device 50 and acquiring the cooperation information.

Effect

As described above, in the present embodiment, the software update device grants the mobile terminal device the authority as the user interface for the update processing based on that the vehicle authenticates the mobile terminal device as the electronic key and the predetermined operation to the vehicle is actually performed using the mobile terminal device as the electronic key. This makes it possible to guarantee the reliability of the mobile terminal device as the user interface.

The disclosed technology can be interpreted as, in addition to the software update device, a method executed by a computer included in each of a network system including the software update device, the external device, the mobile terminal device and various devices, a program and a computer-readable non-transitory storage medium that stores the program, a vehicle provided with the software update device, and a system including the vehicle, the external device, and the mobile terminal device, etc.

The disclosed technology is useful for the software update device of the in-vehicle device mounted on the vehicle, etc.

A software update device according to an aspect of the present disclosure is configured to be controlled in response to a request from a mobile terminal device. The software update device includes one or more processors configured to: acquire cooperation information indicating that connection of the mobile terminal device to a vehicle is made; and manage whether the mobile terminal device is permitted to execute interface processing related to software update, which is determined in accordance with at least the cooperation information.

In the above aspect, the interface processing may include at least one of information presentation and reception of an operation by a user with regard to the software update.

In the above aspect, the connection of the mobile terminal device to the vehicle may include authentication of the mobile terminal device as an electronic key by the vehicle.

In the above aspect, wherein the one or more processors may be configured to permit the mobile terminal device to execute the interface processing when the one or more processors acquire the cooperation information and a user associated with the mobile terminal device is granted an update management authority.

In the above aspect, the one or more processors may be configured not to permit, even when the user associated with the mobile terminal device is granted the update management authority, the mobile terminal device to execute the interface processing when the one or more processors do not acquire the cooperation information.

In the above aspect, the one or more processors may be configured to: acquire user authority information indicating the update management authority of the user associated with the mobile terminal device; and determine whether the user associated with the mobile terminal device is granted the update management authority based on the user authority information.

In the above aspect, the one or more processors may be configured to: transmit the cooperation information to a center; and permit the mobile terminal device to execute the interface processing in accordance with a command from the center, the center being configured to issue the command to permit the mobile terminal device to execute the interface processing when the user associated with the mobile terminal device is granted the update management authority.

In the above aspect, the one or more processors may be configured to: further acquire presentation information indicating that the mobile terminal device has presented a procedure for the interface processing to a user; and permit the mobile terminal device to execute the interface processing when the one or more processors acquire the presentation information.

In the above aspect, the connection of the mobile terminal device to the vehicle may include permission and execution of an opening operation or a closing operation of a driver door of the vehicle as a result that the vehicle authenticates the mobile terminal device as an electronic key.

In the above aspect, the one or more processors may be configured to: acquire execution notification information indicating that the mobile terminal device has notified a user that the software update is executed; and restrict at least a part of control based on a function as an electronic key in response to a request from the mobile terminal device until the one or more processors acquire the execution notification information after the software update is executed.

In the above aspect, the one or more processors may be configured to restrict, after the software update is executed, a predetermined function of the vehicle such that the predetermined function is operable only by a command input to the mobile terminal device.

In the above aspect, the interface processing may include reception of a command indicating whether a progress to a next step is permitted at one or more progress stages of processing of the software update.

In the above aspect, the one or more progress stages may include downloading of update data, installation of update software, and activation of the update software.

In the above aspect, the one or more processors are configured to permit the mobile terminal device to acquire data for executing the software update using a different communication method from a communication method used by the vehicle and provide the acquired data to the vehicle.

In the above aspect, the one or more processors may be configured to request, from a center, information to be used for executing the interface processing when the interface processing related to the software update is permitted.

A software update method according to another aspect of the present disclosure is to be executed by a computer of a software update device configured to be controlled in response to a request from a mobile terminal device. The method includes: acquiring cooperation information indicating connection of the mobile terminal device to a vehicle; and managing whether the mobile terminal device is permitted to execute interface processing related to software update, which is determined in accordance with at least the cooperation information.

A non-transitory storage medium according to another aspect of the present disclosure stores a software update program that is executable by a computer of a software update device configured to be controlled in response to a request from a mobile terminal device and that causes the computer to perform the software update method according to the above aspect.

A software update system according to another aspect of the present disclosure includes: the software update device according to the above aspect; the mobile terminal device; and a center configured to provide information used for executing the interface processing to the mobile terminal device.

A software update system according to another aspect of the present disclosure includes: the software update device according to the above aspect; the mobile terminal device; a center configured to determine whether the mobile terminal device is permitted to execute the interface processing related to the software update based on at least the cooperation information when the software update device acquires the cooperation information, and instruct, based on a determination result, the software update device to permit the mobile terminal device to execute the interface processing.

A center according to another aspect of the present disclosure includes one or a plurality of processors configured to provide information used for executing interface processing related to software update to a mobile terminal device when a software update device permits the mobile terminal device to execute the interface processing based on at least cooperation information indicating that connection of the mobile terminal device to a vehicle is made.

A center according to another aspect of the present disclosure includes one or more processors configured to: acquire, from a software update device, cooperation information indicating that connection of a mobile terminal device to a vehicle is made; and determine whether the mobile terminal device is permitted to execute interface processing related to software update based on at least the cooperation information.

In the above aspect, the one or more processors may be configured to provide information used for executing the interface processing related to the software update when the mobile terminal device is permitted to execute the interface processing.

In the above aspect, the one or more processors may be configured to provide the information used for executing the interface processing in response to a request from the software update device or from the mobile terminal device.

In the above aspect, the center may further include a storage that stores information used for executing the interface processing in association with user authority information indicating whether a user is granted an update management authority, wherein the one or more processors are configured to permit the mobile terminal device to execute the interface processing related to the software update when the one or more processors acquire the cooperation information and a user associated with the mobile terminal device is granted the update management authority.

A vehicle according to another aspect of the present disclosure includes the software update device according to the above aspect.

What is claimed is:

1. A software update device configured to be controlled in response to a request from a mobile terminal device, the software update device comprising circuitry configured to:
   acquire cooperation information indicating that connection of the mobile terminal device to a vehicle is made;
   manage whether the mobile terminal device is permitted to execute interface processing related to a software update, which is determined in accordance with at least the cooperation information;
   acquire execution notification information indicating that the mobile terminal device has notified a user that the software update is executed; and
   restrict at least a part of control based on a function as an electronic key in response to a request from the mobile terminal device until the circuitry acquires the execution notification information after the software update is executed.

2. The software update device according to claim 1, wherein the interface processing includes at least one of information presentation and reception of an operation by a user with regard to the software update.

3. The software update device according to claim 1, wherein the connection of the mobile terminal device to the vehicle includes authentication of the mobile terminal device as an electronic key by the vehicle.

4. The software update device according to claim 1, wherein the circuitry is further configured to permit the mobile terminal device to execute the interface processing when the circuitry acquires the cooperation information and a user associated with the mobile terminal device is granted an update management authority.

5. The software update device according to claim 1, wherein the circuitry is further configured to:
   further acquire presentation information indicating that the mobile terminal device has presented a procedure for the interface processing to a user; and
   permit the mobile terminal device to execute the interface processing when the circuitry acquires the presentation information.

6. The software update device according to claim 1, wherein the connection of the mobile terminal device to the vehicle includes permission and execution of an opening operation or a closing operation of a driver door of the vehicle as a result that the vehicle authenticates the mobile terminal device as an electronic key.

7. The software update device according to claim 1, wherein the interface processing includes reception of a command indicating whether a progress to a next step is permitted at one or more progress stages of processing of the software update.

8. The software update device according to claim 1, wherein the circuitry is further configured to permit the mobile terminal device to acquire data for executing the software update using a different communication method from a communication method used by the vehicle and provide the acquired data to the vehicle.

9. The software update device according to claim 1, wherein the circuitry is further configured to request, from a center, information to be used for executing the interface processing when the interface processing related to the software update is permitted.

10. A software update method to be executed by a computer of a software update device configured to be controlled in response to a request from a mobile terminal device, the method comprising:
   acquiring cooperation information indicating connection of the mobile terminal device to a vehicle;
   managing whether the mobile terminal device is permitted to execute interface processing related to a software update, which is determined in accordance with at least the cooperation information;
   acquiring execution notification information indicating that the mobile terminal device has notified a user that the software update is executed; and
   restricting at least a part of control based on a function as an electronic key in response to a request from the mobile terminal device until the execution notification information is acquired after the software update is executed.

11. A center comprising:
   circuitry configured to:
      acquire, from a software update device, cooperation information indicating that connection of a mobile terminal device to a vehicle is made; and
      determine whether the mobile terminal device is permitted to execute interface processing related to a software update based on at least the cooperation information,
   wherein the interface processing includes at least one of information presentation and reception of an operation by a user with regard to the software update; and
   a storage that stores information used for executing the interface processing in association with user authority information indicating whether a user is granted an update management authority,
   wherein the circuitry is further configured to permit the mobile terminal device to execute the interface processing related to the software update when the circuitry acquires the cooperation information and a user associated with the mobile terminal device is granted the update management authority.

12. The center according to claim 11, wherein the circuitry is further configured to provide information used for executing the interface processing related to the software update when the mobile terminal device is permitted to execute the interface processing.

13. A software update device configured to be controlled in response to a request from a mobile terminal device, the software update device comprising circuitry configured to:
   acquire cooperation information indicating that connection of the mobile terminal device to a vehicle is made;
   manage whether the mobile terminal device is permitted to execute interface processing related to a software update, which is determined in accordance with at least the cooperation information; and
   permit the mobile terminal device to execute the interface processing when the circuitry acquires the cooperation information and a user associated with the mobile terminal device is granted an update management authority.

14. A software update method to be executed by a computer of a software update device configured to be controlled in response to a request from a mobile terminal device, the method comprising:
   acquiring cooperation information indicating connection of the mobile terminal device to a vehicle;
   managing whether the mobile terminal device is permitted to execute interface processing related to a software update, which is determined in accordance with at least the cooperation information; and
   permitting the mobile terminal device to execute the interface processing when the cooperation information is acquired and a user associated with the mobile terminal device is granted an update management authority.

* * * * *